United States Patent [19]

Walton

[11] Patent Number: 4,838,374

[45] Date of Patent: Jun. 13, 1989

[54] SPEED RESPONSIVE REAR WHEEL STEERING

[75] Inventor: Erlen B. Walton, Farmington Hills, Mich.

[73] Assignee: Eaton Corporation, Cleveland, Ohio

[21] Appl. No.: 138,762

[22] Filed: Dec. 28, 1987

[51] Int. Cl.[4] .............................................. B62D 5/08
[52] U.S. Cl. ...................................... 180/140; 74/833; 91/437; 180/141; 280/91
[58] Field of Search ................... 180/140, 141; 280/91, 280/DIG. 9, 81.5, 426, 442, 443; 91/437, 419; 74/833, 837, 522

[56] References Cited

U.S. PATENT DOCUMENTS

| | | | |
|---|---|---|---|
| 275,337 | 4/1883 | Higbe | 74/837 |
| 4,313,514 | 2/1982 | Furukawa et al. | 180/143 |
| 4,621,702 | 11/1986 | Kanazawa et al. | 180/140 |
| 4,646,867 | 3/1987 | Kanazawa et al. | 180/140 |
| 4,666,013 | 5/1987 | Shibahata et al. | 180/141 |
| 4,671,523 | 6/1987 | Naumann | 280/91 |
| 4,697,816 | 10/1987 | Kawamoto et al. | 280/91 |
| 4,719,981 | 1/1988 | Miyoshi | 180/140 |

FOREIGN PATENT DOCUMENTS 55-72941  6/1980  Japan ...................... 74/387

OTHER PUBLICATIONS

SAE Technical Paper Series 860624-Improvement of Vehicle Dynamics by Vehicle-Speed-Sensing Four-Wheel Steering System—Yasuda et al.
Hydronic Corporation Brochure-Remote Control System.

*Primary Examiner*—John A. Pekar
*Attorney, Agent, or Firm*—P. S. Rulon

[57] ABSTRACT

A mechanism (47) is provided for converting rotational movement to substantially linear movement. The mechanism is adapted for incorporation into a vehicle (12) having front and rear wheel steering assemblies (14, 16) and a closed hydraulic system (22) for driving the mechanism in response to-and-fro steering movement of the front wheel steering assembly. The mechanism includes a support housing (98) rotated about an axis (93b) of a drive pinion (93) driven by the closed hydraulic system, a nut (100) threadably receiving a shaft (99) mounted for rotation by the support housing and having an axis (99c) normal to and intersecting an extension of the drive pinion axis (93b), a stepper motor for rotating the shaft to vary the position of the nut with respect to the drive pinion axis (93b), a logic (107) for energizing the motor and positioning the nut as a function of vehicle speed. In one embodiment the nut transmits substantially linear movement directly to the rear wheel steering assembly. In another embodiment, the nut operates a servo valve (208) of a hydraulic power steering system (200) for the rear wheels.

28 Claims, 5 Drawing Sheets

FIG I

FIG 2
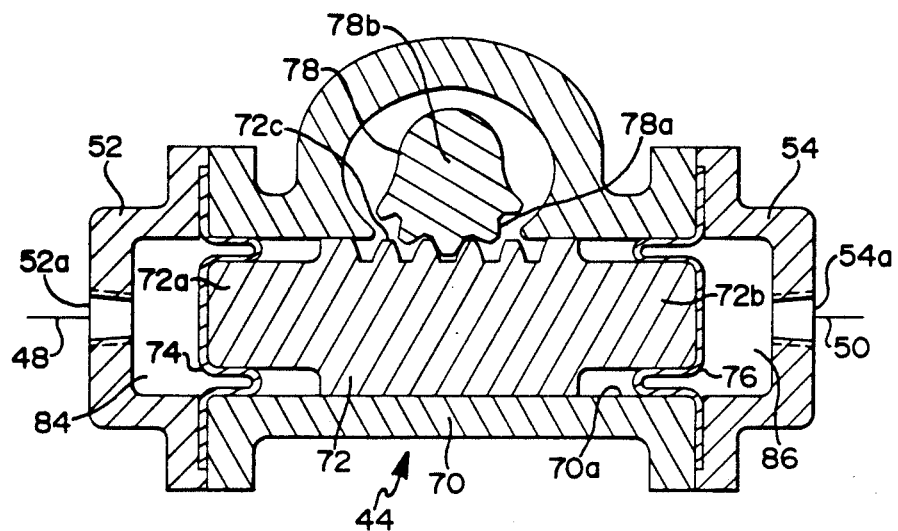
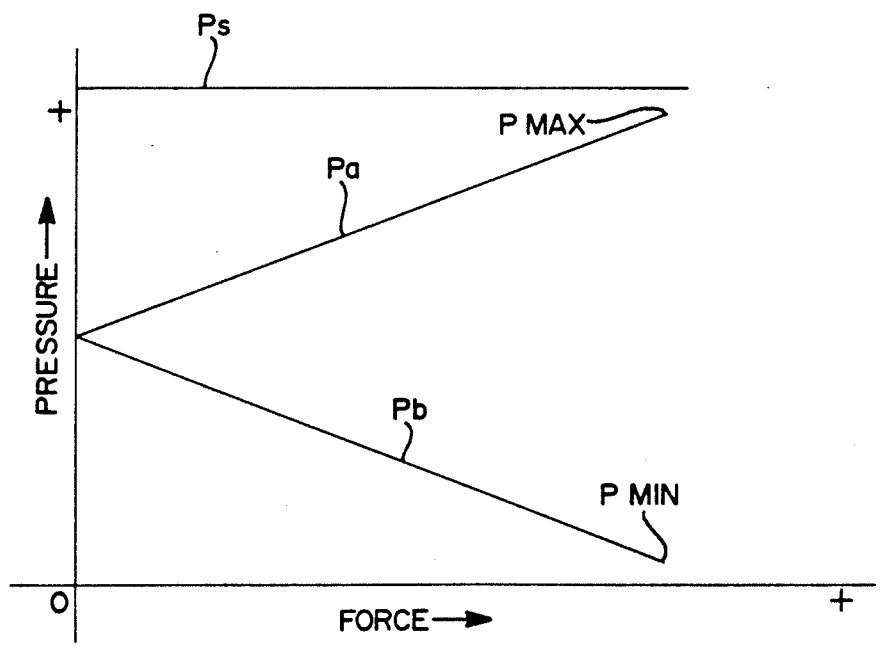
FIG 9

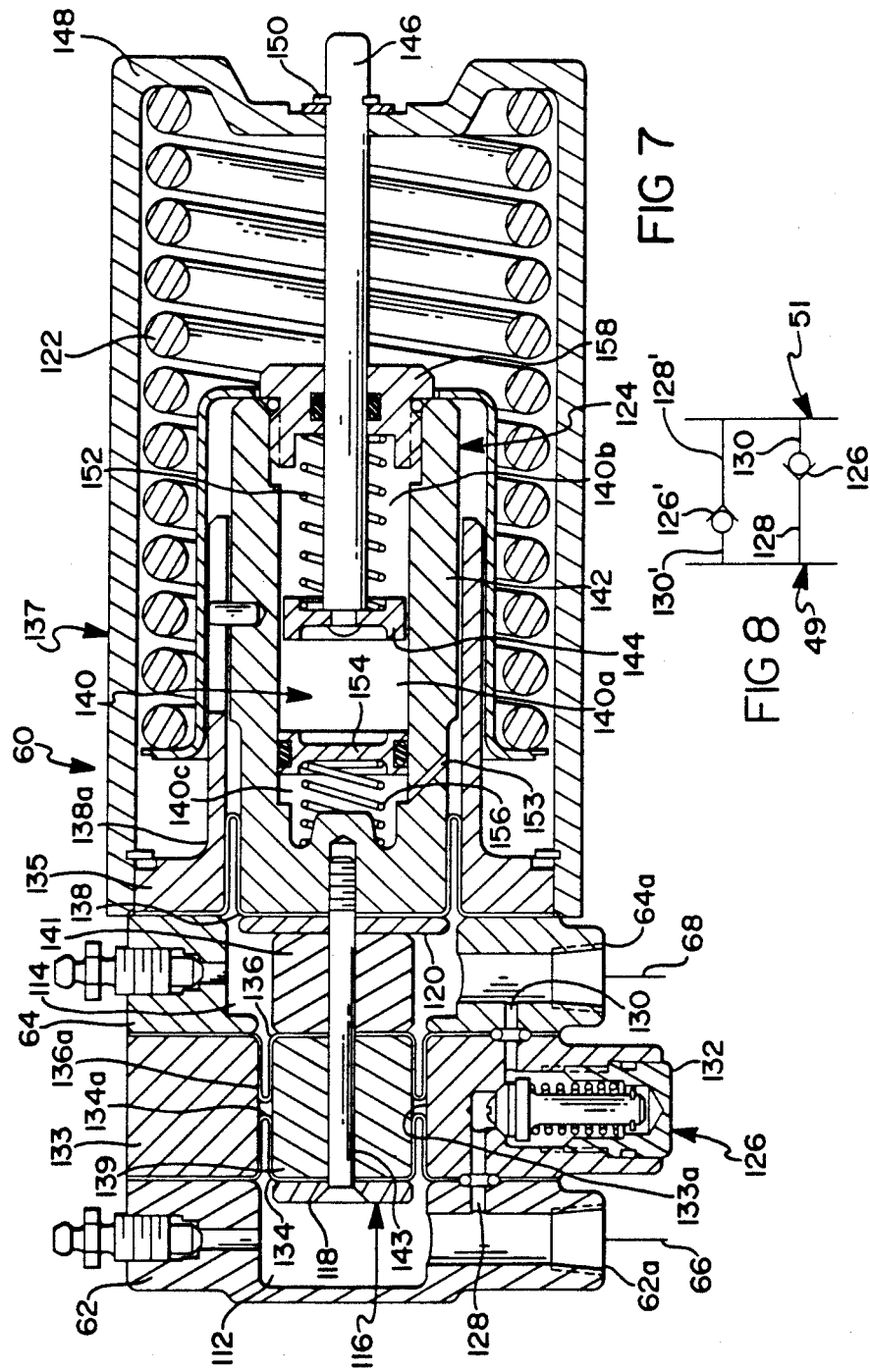

SPEED RESPONSIVE REAR WHEEL STEERING

FIELD OF INVENTION

The present invention relates to four wheel steering. More specifically, the invention relates to apparatus for transmitting steering movement to a rear wheel steering assembly of a vehicle in response to steering movement of a front wheel steering assembly.

DESCRIPTION OF THE PRIOR ART

The purpose of four wheel steering is of course to reduce vehicle turning radius and/or to improve high speed performance of the vehicle. It is known to employ electrical, electrohydraulic hydromechanical, or mechanical apparatus to transmit steering movement to rear wheel steering assemblies of vehicles in response to steering movement of front wheel steering assemblies. In practice, implementation of such apparatus has been expensive, has been somewhat unreliable, and/or has provided less than optimum performance. Further, hydromechanical and mechanical apparatus have been difficult to package into available vehicle space and have been difficult to protect against the harsh environment in which vehicles operate.

In a known four wheel steering system, steering movement of a front wheel steering assembly is transmmitted to a rear wheel steering assembly via a mechanical apparatus in the form of a rotatably mounted shaft means extending longitudinally of the vehicle between the front and rear wheel steering assemblies. The rotatably mounted shaft means senses steering movement of the front wheel steering assembly and also transmits power for steering the rear wheel steering assembly. It is also known to convert this mechanical apparatus to a hydromechanical apparatus by connecting the output of the rotatably mounted shaft to a valve which ports pressurized hydraulic fluid from a motor driven pump to a power cylinder operative to transmit steering movement to the rear wheel steering assembly. It is also known to provide such mechanical and hydromechanical apparatus with means operative to reverse the steering direction of the rear wheels relative to the front wheels from opposite direction to the same direction when vehicle speed exceeds a predetermined amount.

SUMMARY OF THE INVENTION

An object of this invention is to provide a mechanism for converting rotational movement to substantially linear movement.

Another object of this invention to provide such a mechanism for controlling steering movement of the rear wheels of a vehicle.

According to a feature of the invention, a mechanism for converting rotational movement to substantially linear movement comprises support means mounted for rotation about an axis, slidable means secured for rotation with the support means and mounted thereon for sliding movement along a path normal to and intersecting the support means axis; motor means operative to move the slidable means along the path for varying the distance of the slidable means from the support means axis and thereby varying the arcuate distance the slidable means moves in response to a given rotation of the support means; and attachment means defined by the slidable means for pivotal connection to driven means moved substantially linearly in proportion to the arcuate distance the slidable means moves.

According to another feature of the invention, the mechanism is installed in a vehicle having front and rear wheel steering assemblies for effecting steering movement of a rear wheel steering assembly response to steering movement of a front wheel steering assembly and the motor means varies the position of the slidable means along the path in response to variations in the vehicle speed.

According to another feature of the invention, a closed hydraulic system is interposed between the front wheel steering assembly and the mechanism or the closed hydraulic system is disposed between the mechanism and the rear wheel steering assembly.

BRIEF DESCRIPTION OF THE DRAWINGS

A mechanism according to the present invention is shown in the accompanying drawings in which:

FIGS. 2–8 are detailed view of compartments of the mechanism and the steering systems with FIG. 4 being a sectional view looking along line 4—4 of FIG. 5 and FIG. 5 being a sectional view looking along line 5—5 of FIG. 3;

FIG. 9 is a graph of hydraulic system pressure in the system of FIG. 1; and

DETAILED DESCRIPTION OF THE DRAWINGS

Figure 1:
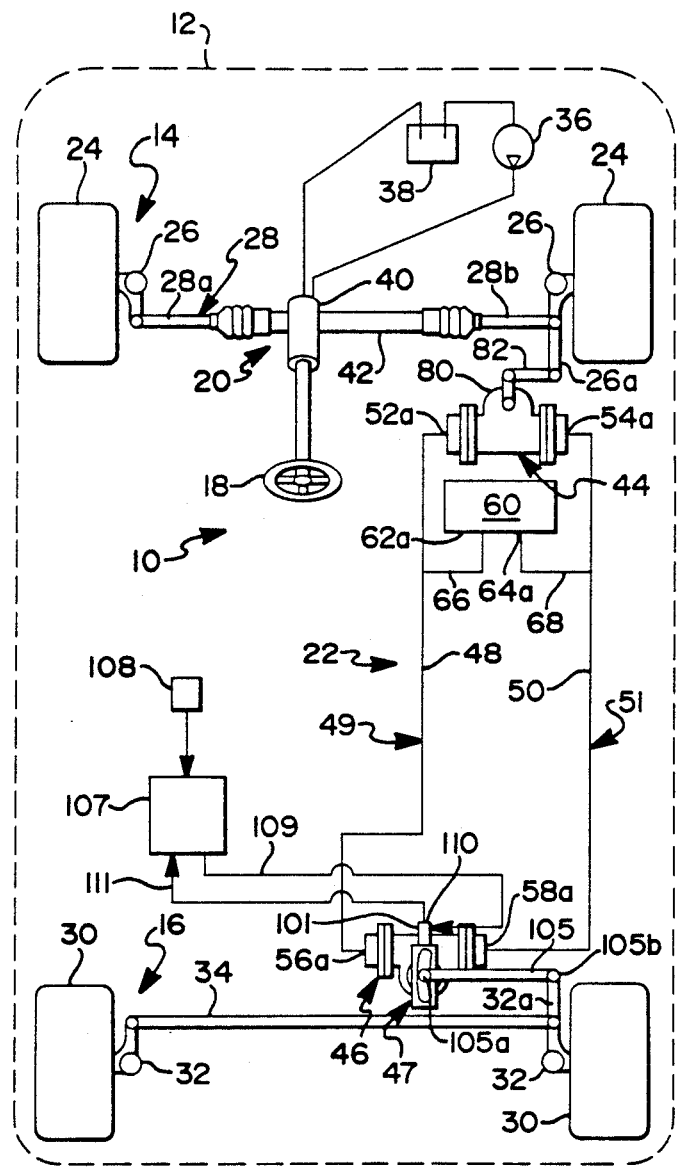
FIG. 1 is a schematic plan view of a steering system with mechanism of the invention disposed between front and rear wheel steering assemblies of a vehicle.
Figure 3:
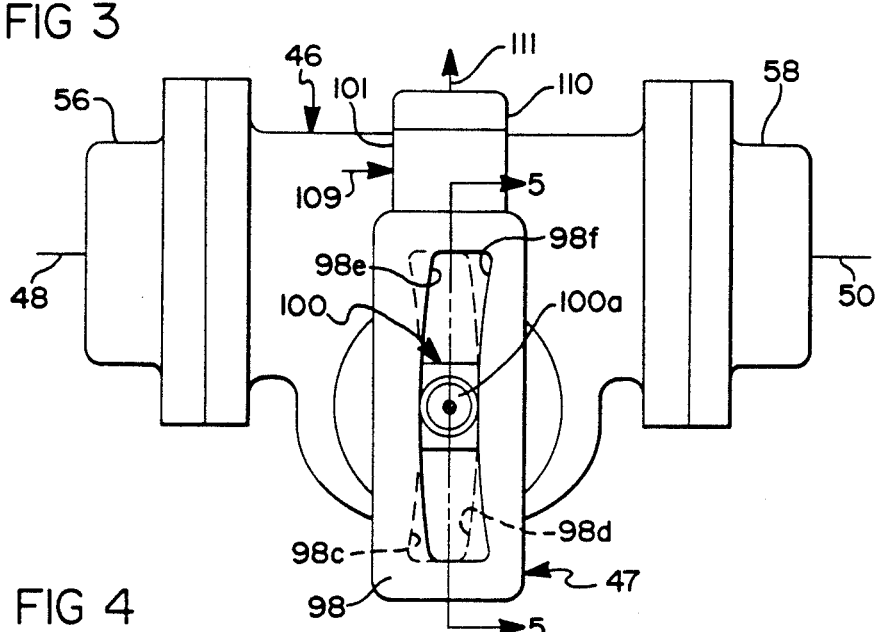
Figure 4:
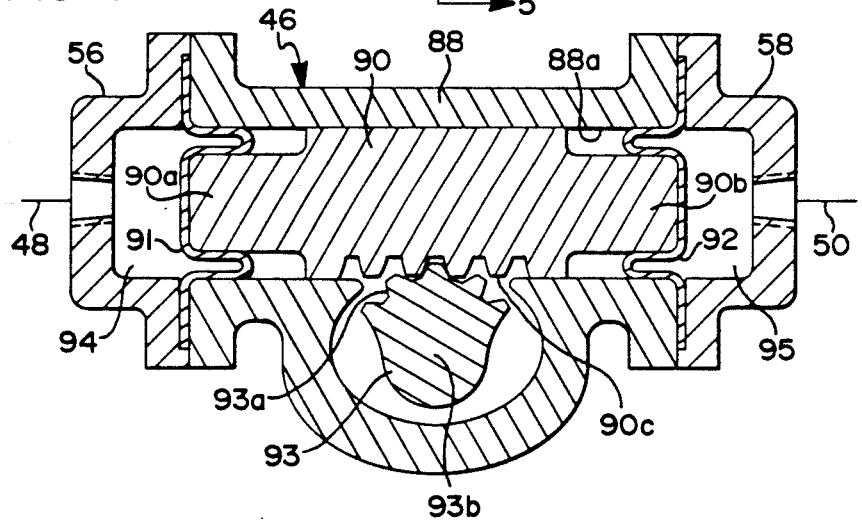

The schematic plan view of FIG. 1 illustrates a steering system 10 for a wheeled vehicle having a body represented by phantom line 12, and front and rear steerable wheel assemblies, 14, 16. The system includes a steering wheel 18, apparatus or first means 20 for transmitting steering movement of the steering wheel to the front wheel steering assembly, and a closed hydraulic system or second means 22 for transmitting steering movement to the rear wheel steering assembly in response to steering movement of the front wheel steering assembly.

The front wheel steering assembly 14 includes front wheels 24 each having a steering knuckle arm 26 pivotally connected together by tie rod ends 28a, 28b of a tie rod or ram 28 disposed for to-and-fro movement transverse to the longitudinal direction of the vehicle in known manner. The tie rod or ram 28 forms part of apparatus 20 and is discussed further hereinafter. The rear wheel steering assembly 16 includes rear wheels 30 each having a steering knuckle arm 32 pivotally connected together by a tie rod 34 disposed for to-and-fro movement transverse to the longitudinal direction of the vehicle.

Apparatus 20 may be any of several well known mechanical non-power or power steering assemblies which transmit steering movement to front wheel steering assemblies in response to steering movement of a steering wheel. Apparatus 20 is preferably of the power steering type and, as illustrated therein, is of the well known hydraulic type including a source of pressurized hydraulic oil or fluid provided by a pump 36 in known manner, a sump 38, and a servo valve 40 for connecting or communicating the source and sump with opposite sides of an unshown piston disposed in a power cylinder 42. Tie rod ends 28a, 28b extend from opposite sides of the pistons and move together in to-and-fro motion in response to alternate porting or communication of opposite sides of the piston with the source and sump by valve 40.

Closed hydraulic system 22 includes a pump assembly 44 (see FIGS. 1, 2), an actuator assembly 46 having a mechanism 47 incorporated therewith (see FIGS. 1, 3-6), and conduits or passages 48, 50 respectively connected at one end to ports 52a, 54a defined by end caps 52, 54 of the pump assembly and respectively connected at the other end to ports 56a, 58a defined by end caps 56, 58 of the actuator assembly. System 22 may also include a reservoir assembly 60 having ports 62a, 64a respectively connected to conduits 48, 50 by conduits or passages 66, 68.

Pump assembly 44 includes a cylinder portion or center housing member 70 defining a cylindrical bore 70a, a piston member or movable means 72 slidably disposed in the bore and having oppositely facing ends 72a, 72b supporting roll type diaphragms 74, 76, the end caps 52, 54, and a pinion or drive means 78 having teeth 78a in mesh with rack teeth 72c defined by piston 72. Pinion 78 is supported for rotation by housing member 70 in a conventional manner and is rotated about its axis 78b in response to steering movement of the front wheel steering assembly by a linkage assembly. The linkage assembly includes a rigid extension 26a of steering knuckle arm 26, an arm 80 non-rotatably fixed at one end to pinion 78, and a link 82 pivotally connected at its opposite ends to extension 26a and arm 80. Diaphragms 74, 76 are sealingly sandwiched between the housing and end caps to define volumes 84, 86. The end caps are secured to the housing in known manner, e.g., by unshown screws. Volumes 84, 86 vary inversely in volume in response to sliding movement of the piston due to rotation of pinion 78. Diaphragms 74, 76 hermetically seal the volumes at piston ends 72a, 72b and, combination with piston 72, provide a movable partition sealingly separating the volumes against fluid communication therebetween.

Actuator assembly 46 differs from pump assembly 44 by being upside-down in the drawings and having mechanism 47 mounted thereon. Assembly 46 includes a cylinder portion or center housing member 88 defining a cylindrical bore 88a, a piston member 90 slidably disposed in the bore and having oppositely facing ends 90a, 90b supporting roll type diaphragms 91, 92, the end caps 56, 58; and a pinion or drive member 93 having teeth 93a in mesh with rack teeth 90c defined by piston 90. In a manner analogous to pump 44, diaphragms 91, 92 are sealing sandwiched between the housing end caps 56, 58 to define volumes 94, 95 which vary inversely in volume in response to sliding movement of piston 90. More specifically, volumes 94, 95 vary inversely in volume in response to sliding movement of pump piston 72 and thereby effect sliding movement of piston 90. The diaphragms also hermetically seal the volumes at piston ends 90a, 90b and in combination with piston 90 provide a movable partition sealingly separating volumes 94, 95 against fluid communication therebetween. Pinion 93 is mounted for rotation by bearing 96, 97 supported by housing member 88 and is rotated to-and-fro about its axis 93b in response to to-and-fro fluid flow in closed branches 48, 50 causing to-and-fro sliding movement of piston 90.

Conduits 48, 50, pump volumes 84, 86, and actuator volumes 94, 95 define first and second closed fluid flow branches or closed fluid links 49, 51 between the pump and actuator pistons. The branches are filed with a non-compressible oil. Hence sliding movement of pump piston 72 in response to steering movement of the front wheel steering assembly causes fluid flow in both branches and a corresponding sliding movement of actuator piston 90. The pistons move the same amount where the displacement surface areas of their piston ends and diaphragms are the same.

Mechanism 47 includes a support housing 98 fixed to pinion or drive 93 for rotation about the drive axis 93b, a shaft 99 having ends 99a, 99b supported by the support housing for rotation about the shaft axis 99c which is normal to and intersecting drive axis 93b, a nut or slidable assembly 100 having a threaded opening 100a mating or threadably cooperating with external screw threads 99d on the shaft, and a stepper motor assembly 101 having its housing secured to the support housing. Nut 100 and shaft 99 may be of the well known ball screw type.

Figure 6:
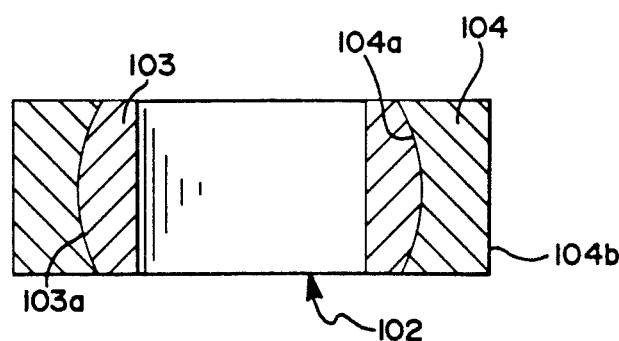
Figure 5:
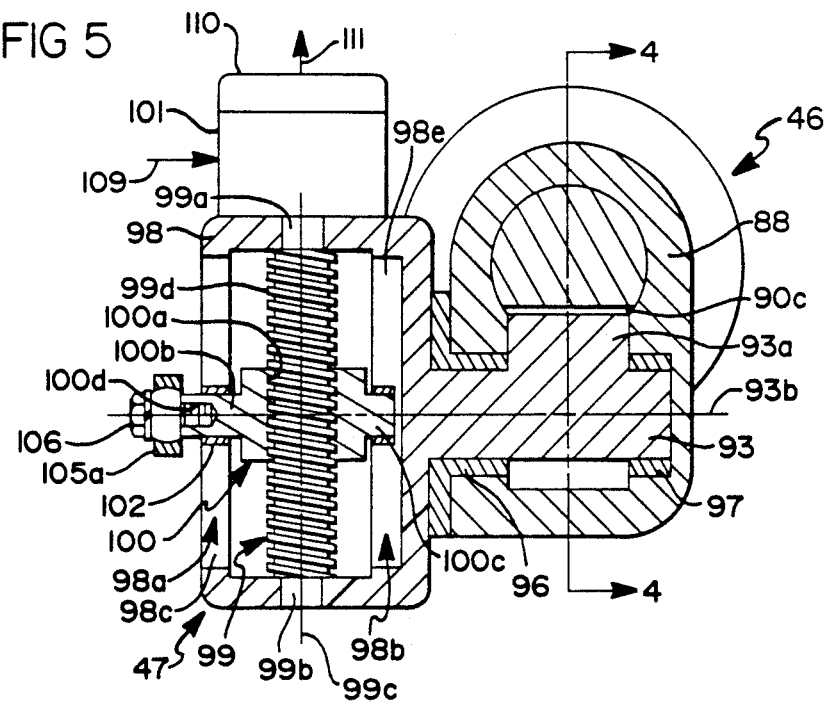

Support housing 98 includes slots 98a, 98b extending in the direction of shaft axis 99c and having radius of curvature facing in opposite direction or sense and respectively defined by surface portions 98c, 98d and 98e, 98f. Slidable assembly 100 includes guide or support arms 100b, 100c extending radially outward along a diameter of the shaft 99 and respectively received by slots 98a, 98b to guide and limit free play about the shaft axis 99c. The two arm-two slot arrangement limits side loading on shaft 99. Alternatively, one arm on its associated slot may be eliminated. The arms each preferably have a bearing 102 mounted thereon to limit friction. The bearings are preferably of the self aligning type which are preferably of the self aligning type which are necessary when slots 98a, 98b are curved. One of the bearings is shown in FIG. 6. Each bearing includes an inner member or race 103 having a crowned outer surface 103a supporting a mating inner surface 104a of an outer roller or race 104 having an outer surface 104b of slightly less diameter than the distance between the surfaces of the associated slot.

Arm 100b includes an attachment in the form of a threaded bore 100d for pivotally adapting the nut or slidable assembly for connection to a self aligning end 105a of a driven link 105 via a screw 106. Link 105 is pivotally connected at its other end 105b to a rigid extension 32a of a rear wheel steering knuckle arm 32.

Shaft 99 and curved slots 98a, 98b define the path for sliding movement of nut assembly 100 in response to rotation of shaft 99 by the stepper motor. Slots 98a, 98b are curved to limit linear movement of link 105 in response to movement of the nut assembly along the shaft axis 99c. Since shaft 99 is straight and the slots are curved, the arms will pivot about the shaft axis and the attachment end of arm 100b will move toward the link 105. Hence, the center of curvature of the slots may be greater than the distance to between link ends 105a, 105b.

Rotation of shaft 99 by stepper motor 101 varies the radial position or distance of the nut assembly with respect to drive axis 93b for varying the steering ratio of the front and rear wheel steering assemblies and for changing the direction of rear wheel steering with respect to the front wheels. When nut arms 100b, 100c are centered along drive axis 93b, no linear motion is transmitted to link 105 in response to rotation of support housing 98; hence, the rear wheel steering is inactive. When the nut arms are displaced radially downward from the drive axis, the rear wheels are steered in the same direction as the front wheels. When the nut arms are displaced upward above the drive axis, the rear wheels are steered in the opposite direction of the front wheels. The further the distance the nut arms are from the drive axis, the greater is the arcuate distance they travel for a given front wheel steering angle or given rotation of the support housing; accordingly, greater amounts of substantially linear movements are transmitted to the driven link 105 for effecting greater steering angles of the rear wheels.

Stepper motor 101 is controlled in known manner by a logic 107 which receives a vehicle speed signal from a sensor 108. Signals for rotating the stepper motor and shaft 99 driven thereby are transmitted via a cable assembly 109. The rotary position of the stepper motor and, hence, the position of nut arms 100b, 100c is sensed by a position sensor 110 and transmitted to the logic via a cable assembly 111. Accordingly, the position of nut arms 100b, 100c with respect to drive axis 93b is always known by logic 107. By way of example only, logic 107 sends signals to stepper motor 101 to move nut arms upward above the drive axis increasing distances as vehicle speed progressively decreases from twenty-two miles per hour to effect increasing opposite direction rear wheel steering angles with decreasing vehicle speed. In the opposite sense, logic 107 sends signals to the stepper motor to move the nut arms downward below the drive axis increasing distances as vehicle speed progressively increases above twenty-two miles per hour to effect increasing same direction rear wheel steering angles with increasing vehicle speed.

Looking now at FIG. 7, closed hydraulic system 22 is preferably provided with reservoir assembly 60 which includes closed reservoir chambers 112, 114 respectively communicating with conduits 48, 50 or branches 49, 51, a piston assembly 116 having circular and annular surfaces 118, 120 facing axially in the same direction and of substantially equal effective area acting on the fluid in chambers 112, 114, a spring 122 biasing the surface areas in direction tending to decrease the volumes of the chambers and therefore applying substantially equal precharge pressures to both branches when no external forces are acting on the pump and/or actuator pistons, and a damper or dash pot like assembly 124 for limiting the rate of movement of piston assembly 116. The purpose of dash pot assembly 124 is to prevent rapid change in the rear wheel steering angle in the event of rapid fluid loss in either of the branches. For convenience sake, the reservoir has incorporated therein two relief valve assemblies 126; 126'. Assembly 126' is shown only in schematic form in FIG. 8. The valve assemblies relieve excess differential pressure between the branches to prevent loss of front wheel steering control due to excessively high pressure in the closed hydraulic system; such pressure could be caused by seizure of movable components associated with the closed hydraulic system. The valve assemblies differ mainly with respect to the position of passages 128, 130 and 128', 130'. Passages 128, 130 are positioned to effect high pressure relief in branch 49 and the passages for 128', 130' are positioned to effect high pressure relief in branch 51. At least one of the valve assemblies includes a threaded member 132 which may be backed out to allow free fluid flow between the branches for repositioning the pumps and/or actuator pistons to their neutral positions after occurrence of an over-pressure condition. Further, member 132 may be used for neutral positioning or centering the piston during or prior to system installation.

The reservoir chambers 112, 114 are hermetically sealed by three roll type diaphragms 134, 136, 138 having their outer portions respectively sandwiched between housing members 62, 133; 133, 64; and 64, 135. Housing members 62, 133, 64, 135, and 148 define a housing assembly 137 which is rigidly secured together by unshown fasteners such as screws. A through bore 133a in member 133 provides an opening between adjacent open portions of chambers 112, 114. Puck like members 139, 141, a member 142 and the diaphragms are rigidly secured together by a screw 143. Diaphragms 134, 136 and member 139 define a first movable partition disposed in the opening between adjacent open portions of the reservoirs chambers for sealingly separating the reservoirs against fluid communication therebetween. Diaphragm 138 and member 142 define a second movable partition axially spaced from and fixed for movement with the first movable partition for sealing the second opening in chamber 114. The effective surface areas of the circular and annular piston surface areas 118, 120 is substantially determined by the diametrical distance between the midpoints 134a, 136a, 138a of the folds of the respective diaphragms. For circular piston surface 118 the effective surface area is determined merely by the diametrical distance between the fold midpoints 134a. For annular piston surface 128 the effective surface area is determined by the difference of the diametrical distances between the midpoints 138a, 136a of diaphragms 138, 136.

Dash pot assembly 124 includes a cylindrical chamber 140 formed in the member 142 of the piston assembly, a loosely fitting piston 144 dividing the chamber into subchambers 140a, 140b, a rod 146 fixed at one end to piston 144 and secured to the housing member 148 by a snap ring 150 which limits leftward movement of the piston relative to the housing member, a spring 152 biases the piston and rod leftward, and a third subchamber 140c vented to ambient by a passage 153 and sealed from subchamber 140a by a slidable piston 154 biased rightward by a spring 156. Chambers 140a, 140b are filed with a non-compressible viscous fluid such as silicone fluid which extrudes through a restriction defined by the space between piston 144 and the cylinder wall to prevent rapid leftward movement of piston assembly 116. Subchamber 140c facilitates silicone fluid displacement when an end cap 158 is threaded into the open end of cylindrical chamber 140 and also accommodates thermal expansion of the silicone fluid.

The biasing force of reservoir spring 122 acting on the hydraulic oil in branches 49, 51 via piston surface areas 118, 120 maintains the sum of the fluid pressures in the branches substantially constant during non-operational and operational modes of the closed hydraulic system. The graph of FIG. 9 illustrates the hydraulic pressure characteristics in branches 49, 51 as external forces acting on pump and actuator pistons 72, 90 increase from zero in response to steering forces transmitted by front and rear wheel steering assemblies 14, 16. A curve $P_a$ represents the pressure in one branch, a curve $P_b$ represents the pressure in the other branch, and a constant pressure curve $P_s$ represents the sum of the pressures in both branches during all modes of operation. As the forces for maintaining or changing rear wheel steering angles in any direction increase, the pressure in the branch providing the necessary force increases proportionally and the pressure in the other branch decreases proportionally.

As previously mentioned, one purpose of relief valve assemblies 126, 126' is to prevent loss of front wheel steering control due to excessively high pressures in the closed hydraulic system. Another purpose for the relief valves is to maintain a positive fluid pressure in both branches, thereby preventing reverse flexing of the roll type diaphragms in the pump, actuator and reservoir assemblies. The positive pressure is maintained by setting $P_{max}$ of both valves to a pressure less than $P_s$, thereby ensuring that $P_{min}$ is alwasy positive since $P_{max} + P_{min} = P_a + P_b = P_s$ and since $P_{max} < P_s$.

Still further, the relief valve assemblies and stops for limiting travel of actuator piston 90 provide means for establishing or re-establishing the correct positional or phase relationship between pump and actuator piston 72, 90. Herein, faces 56b, 58b of end caps 56, 58 provide the stops. In the event of an out of phase condition, one of diaphragms 91, 92 will be pushed against one of faces 56b, 58b by the associated piston end prematurely or before the front wheels reach their maximum steering angle in one direction. Accordingly, an operator need merely turn the front wheels through their maximum steering angle with enough force fo cause an overpressure condition in the branch corresponding to the premature stop engagement, whereby fluid in the overpressured branch will flow to the other branch via one of the relief valve assemblies.

The positive pressure provides a no backlash fluid link between the pump and actuator pistons regardless of the length of the path of the conduits interconnecting the pump and actuator. Further, the fluid link requires no adjustment during initial installation or subsequent repairs and also maintains precise positional relationship between the pump and actuator pistons independent of temperature changes.

Figure 10:
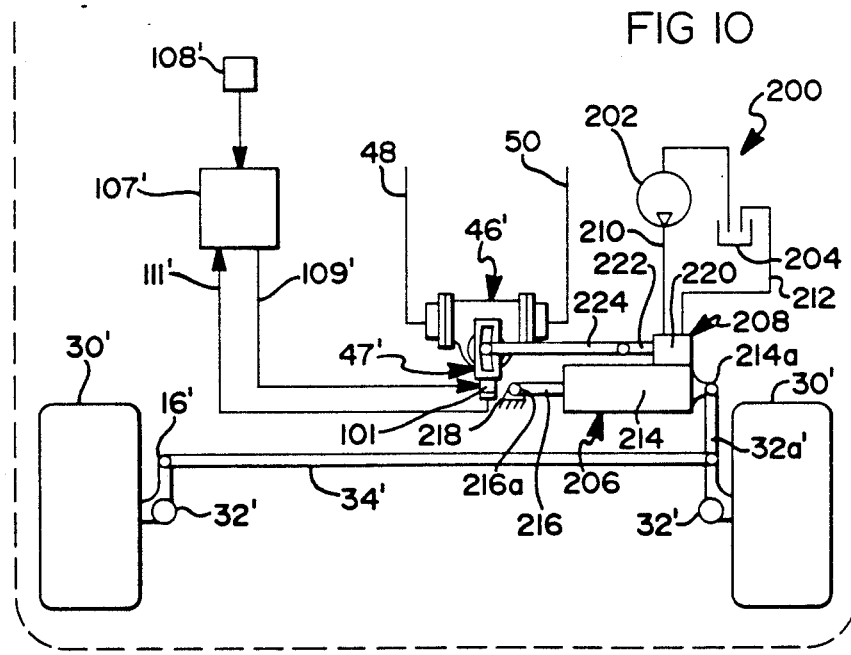
FIG. 10 is an alternative embodiment of the steering system employing a power hydraulic system between the mechanism and the rear wheel steering assembly.

Looking now at an alternative embodiment of the steering system shown in FIG. 10, therein components identical to components in the previous embodiment are given the same reference character with a prime suffix. The embodiment of FIG. 10 differs from that of the previous embodiment by having a power hydraulic system 200 interposed between mechanism 47' and rigid extension 32a' of the rear wheel steering assembly. System 200 includes a source of pressurized hydraulic oil or fluid provided by a pump 202, a sump or sumps 204, a power hydraulic cylinder 206, and a servo valve 208 for connecting or communicating the source and sump with opposite sides of an unshown piston disposed in the power cylinder 206. Such communication is via conduits 210, 212 and unshown passages in known manner. Pump 36 and sump 38 may be common to both power hydraulic systems in lieu of separate pump 202 and reservoir 204.

Power cylinder 206 includes a cylinder housing 214 having an end 214a pivotally connected to rigid extension 32a' and a ram 216 fixed at one end to the unshown piston in cylinder housing 214 and pivotally secured at its other end 216a to a grounded or non-movable member 218.

Servo valve 208 includes a housing 220 fixed to power cylinder housing 214 and a valving member 222 movable leftward or rightward from the center/neutral position with respect to the servo housing by a driven link 224 pivotally connected at its ends to mechanism 47' and the valving member. Movement of the valving member to the left of its off position effects leftward movement of the cylinder housing 214 in known manner and a corresponding counterclockwise turning in angle of the rear wheels. The valving member is returned to its off or neutral position with respect to the servo housing as the power cylinder moves leftward. Operation in response to rightward movement of the valving member is merely the reverse of the above.

A preferred embodiment of the invention has been disclosed for illustrative purposes. Many variations and modifications of the disclosed embodiment are believed to be within the spirit of the invention. The following claims are intended to cover the inventive portions of the disclosed embodiment, variations and modifications believed to be within the spirit of the invention.

What is claimed is:

1. A mechanism for converting rotational movement to substantially linear movement, the mechanism comprising:

support means mounted for rotation about an axis;

slidable means secured for rotation with the support means and mounted thereon for sliding movement along a path normal to and intersecting the support means axis, said slidable means including a through opening receiving a shaft having an axis disposed along the path, said slidably means also including guide means extending radially outward therefrom with respect to the shaft axis and received by slot means defined by the support means, and said slot means having oppositely facing surfaces embracing the guide means to limit rotational free play of the slidable means about the shaft axis;

motor means operative to move the slidable means along the path for varying the distance of the slidable means from the support means axis and thereby varying the arcuate distance the slidable means moves in response to a given rotation of the support means, said motor means including means for positioning the slidable means on opposite sides of the support means axis for effecting movement of the linkage means in opposite senses in response to a given rotation of the support means; and attachment means defined by the slidable means for pivotal connection to driven means moved substantially linearly in proportion to the arcuate distance the slidable means moves.

2. The mechanism of claim 1, wherein the slidable means through opening includes threads in screw thread relation with external threads of the shaft, the support means includes means mounting the shaft thereon for rotation about the shaft axis by the motor means.

3. The mechanism of claim 1, wherein the slot means has a radius of curvature defined by the oppositely facing surfaces for substantially preventing linear movement of the driven means in response to movement of the slidable means along the shaft axis.

4. The mechanism of claim 3, wherein the slidable means through opening includes threads in screw thread relation with external threads of the shaft, the support means includes means mounting the shaft thereon for rotation about the shaft axis by the motor means.

5. A mechanism for converting rotational movement to substantially linear movement, the mechanism comprising:

support means mounted for rotation about an axis;

slidable means secured for rotation with the support means and mounted thereon for sliding movement along a path normal to and intersecting the support means axis, said slidable means including a through bore receiving a shaft having an axis disposed along the path, said slidable means also including guide arms extending radially outward along a diameter of the shaft axis and received by slots defined by the support means, and said slots each having oppositely facing surfaces embracing the guide arms to limit rotational free play of the slidable means about the shaft axis;

motor means operative to move the slidable means along the path for varying the distance of the slidable means from the support means axis and thereby varying the arcuate distance the slidable means moves in response to a given rotation of the support means; and attachment means defined by the slidable means for pivotal connection to driven means moved substantially linearly in proportion to the arcuate distance the slidable means moves.

6. The mechanism of claim 5, wherein one of said support arms defines said attachment means, the slot receiving the one support arm having a radius of curvature defined by the oppositely facing surfaces for substantially preventing linear movement of the driven means in response to movement of the slidable means along the shaft axis, and the other slot having a radius of curvature in the opposite sense.

7. A mechanism for converting rotational movement to substantially linear movement, the mechanism comprising:

support means mounted for rotation about an axis;
slidable means secured for rotation with the support means and mounted thereon for sliding movement along a path normal to and intersecting the support means axis, said slidable means including a threaded through opening in screw thread relation with external threads of a shaft mounted for rotation on the support means and having an axis disposed along the path, and the shaft rotated by the motor means for moving the slidable means along the path;

motor means operative to move the slidable means along the path for varying the distance of the slidable means from the support means axis and thereby varying the arcuate distance the slidable means moves in response to a given rotation of the support means; and attachment means defined by the slidable means for pivotal connection to driven means moved substantially linearly in proportion to the arcuate distance the slidable means moves.

8. The mechanism of claim 7, wherein the support means includes first and second slots respectively disposed on opposite sides of the slidable means and extending in parallel relation with the path, and the slidable means includes first and second guide arms extending radially outward along a diameter of the shaft and receiving by the slots for limiting rotational free play of the slidable means about the shaft axis.

9. A steering assembly for a wheeled vehicle having front and rear dirigible wheel assemblies; the steering assembly comprising:

first means for transmitting steering movement of a steering wheel to a front wheel steering assembly;

second means for transmitting steering movement to a rear wheel steering assembly in response to steering movement of the front wheels steering assembly, the second means including drive means mounted for to-and-fro rotation about an axis in respone to to-and-fro steering movement of the front wheel steering assembly; the improvement comprising:

support means fixed for rotation with the drive means about the drive means axis;

slidable means secured for rotation with the support means and mounted thereon for sliding movement along a path normal to and intersecting the drive means axis means axis;

motor means operative to move the slidable means along the path and vary the distance of the slidable means from the drive means axis in response to changes in vehicle speed, thereby varying the arcuate distance the slidable means moves in response to a given rotation of the support means;

linkage means connected at one end to the slidable means and moved substantially linearly to effect steering movement of the rear wheel steering assembly in response to rotation of the support means about the drive means axis.

10. The mechanism of claim 9, wherein said motor means includes means for positioning the slidable means on opposite sides of the drive means axis for effecting movement of the linkage means in opposite senses in response to a given rotation of the support means.

11. The mechanism of claim 10, wherein said slidable means includes a through opening receiving a shaft having an axis disposed along the path, said slidably means also including guide means extending radially outward therefrom with respect to the shaft axis and received by slot means defined by the support means, said slot means having oppositely facing surfaces embracing the guide means to limit rotational free play of the slidable means about the shaft axis.

12. The mechanism of claim 11, wherein the slidable means through opening includes threads in screw thread relation with external threads of the shaft, the support means includes means mounting the shaft thereon for rotation about the shaft axis by the motor means.

13. The mechanism of claim 11, wherein the slot means has a radius of curvature defined by the oppositely facing surfaces for substantially preventing linear movement of the driven means in response to movement of the slidable means along the shaft axis.

14. The mechanism of claim 13, wherein the slidable means through opening includes threads in screw thread relation with external threads of the shaft, the support means includes means mounting the shaft thereon for rotation about the shaft axis by the motor means.

15. The mechanism of claim 10, wherein said slidable means includes a through bore receiving a shaft having an axis disposed along the path, said slidable means also including guide arms extending radially outward along a diameter of the shaft axis and received by slots defined by the support means, said slots each having oppositely facing surfaces embracing the guide arms to limit rotational free play of the slidable means about the shaft axis.

16. The mechanism of claim 15, wherein one of said support arms defines said attachment means, the slot receiving the one support arm having a radius of curvature defined by the oppositely facing surfaces for substantially preventing linear movement of the driven means in response to movement of the slidable means along the shaft axis, and the other slot having a radius of curvature in the opposite sense.

17. The mechanism of claim 10, wherein said slidable means includes a threaded through opening in screw thread relation with external threads of a shaft mounted for rotation on the support means and having an axis disposed along the path, and the shaft rotated by the motor means for moving the slidable means along the path.

18. The mechanism of claim 17, wherein the support means includes first and second slots respectively disposed on opposite sides of the slidable means and extending in parallel relation with the path, and the slidable means includes first and second guide arms extending radially outward along a diameter of the shaft and receiving by the slots for limiting rotational free play of the slidable means about the shaft axis.

19. A steering assembly for a wheel vehicle having front and rear dirigible wheel assemblies, the steering assembly comprising:
  first means for transmitting steering movement of a steering wheel to a front wheel steering assembly;
  second means for transmitting steering movement to a rear wheel steering assembly in response to steering movement of front wheel steering assembly, the improvement comprising:
  a hydraulic system including first and second closed fluid flow branches, a pump device connected to one end of each closed branch for effecting to-and-fro fluid flow in the closed branches in response to to-and-fro steering movement of the front wheel steering assembly, an actuator device connected to the other end of each closed branch for effecting to-and-fro rotational movement of a drive means in response to the to-and-fro fluid flow;
  support means mounted for rotation about an axis in response to rotation of the drive means;
  slidable means secured for rotation with the support means and mounted thereon for sliding movement along a path normal to and intersecting the support means axis;
  motor means operative to move the slidable means along the path and vary the distance of the slidable means from the support means axis in response to changes in vehicle speed, thereby varying the arcuate distance the slidable means moves in response to a given rotation of the support means; and
  linkage means connected at one end to the slidable means and moved substantially linearly to effect steering movement of the rear wheel steering assembly in response to rotation of the support means about the drive means axis.

20. The mechanism of claim 19, wherein said motor means includes means for positioning the slidable means on opposite sides of the support means axis for effecting movement of the linkage means in opposite senses in response to a given rotation of the support means.

21. The mechanism of claim 20, wherein said slidable means includes a through opening receiving a shaft having an axis disposed along the path, said slidably means also including guide means extending radially outward therefrom with respect to the shaft axis and received by slot means defined by the support means, said slot means having oppositely facing surfaces embracing the guide means to limit rotational free play of the slidable means about the shaft axis.

22. The mechanism of claim 21, wherein the slidable means through opening includes threads in screw thread relation with external threads of the shaft, the support means includes means mounting the shaft thereon for rotation about the shaft axis by the motor means.

23. The mechanism of claim 21, wherein the slot means has a radius of curvature defined by the oppositely facing surfaces for substantially preventing linear movement of the driven means in response to movement of the slidable means along the shaft axis.

24. The mechanism of claim 23, wherein the slidable means through opening includes threads in screw thread relation with external threads of the shaft, the support means includes means mounting the shaft thereon for rotation about the shaft axis by the motor means.

25. The mechanism of claim 20, wherein said slidable means includes a through bore receiving a shaft having an axis disposed along the path, said slidable means also including guide arms extending radially outward along a diameter of the shaft axis and received by slots defined by the support means, said slots each having oppositely facing surfaces embracing the guide arms to limit rotational free play of the slidable means about the shaft axis.

26. The mechanism of claim 25, wherein one of said support arms defines said attachment means, the slot receiving the one support arm having a radius of curvature defined by the oppositely facing surfaces for substantially preventing linear movement of the driven means in response to movement of the slidable means along the shaft axis, and the other slot having a radius of curvature in the opposite sense.

27. The mechanism of claim 20, wherein said slidable means includes a threaded through opening in screw thread relation with external threads of a shaft mounted for rotation on the support means and having an axis disposed along the path, and the shaft rotated by the motor means for moving the slidable means along the path.

28. The mechanism of claim 27, wherein the support means includes first and second slots respectively disposed on opposite sides of the slidable means and extending in parallel relation with the path, and the slidable means includes first and second guide arms extending radially outward along a diameter of the shaft and receiving by the slots for limiting rotational free play of the slidable means about the shaft axis.

* * * * *